Patented Feb. 6, 1940

2,189,128

UNITED STATES PATENT OFFICE 2,189,128

PROCESS OF REFINING A MINERAL OIL

Ferdinand W. Breth, New York, N. Y., and Manuel Blumer, Butler, Pa.

No Drawing. Application July 17, 1936, Serial No. 91,100. Renewed April 27, 1939

5 Claims. (Cl. 260—504)

This invention relates to a process of refining a mineral oil.

An object of the invention is to provide a process of refining a mineral oil fraction by treatment with oleum, wherein the drastic action of the oleum is diminished.

Another object is to increase the yield of the oil soluble mahogany sulphonic bodies formed by the acid treatment.

In refining a mineral oil, as for example in the preparation of a white oil, such as tree spray or transformer oil, a mineral oil fraction is treated with oleum to remove from the oil the undesired components. These components react with the acid to form water soluble green sulphonic acids which are soluble in the acid sludge, and oil soluble mahogany sulphonic acids which remain dissolved in the oil layer. The oil layer is separated from the acid sludge, and the mahogany sulphonic acids are recovered from the oil as such or as soaps. This may be done in any desired manner, as by extracting the oil with an organic solvent for the sulphonic acids, such as dichlorethyl ether, and removing the mahogany acids from the ether layer. Alternatively, the oil layer containing the mahogany sulphonic acids may be neutralized and extracted with a water soluble organic solvent for the mahogany sulphonates, such as ethyl alcohol. The alcoholic layer is removed and the alcohol is distilled off.

We have discovered that the drastic action of the oleum during refining may be diminished and that the yield of mahogany sulphonic acids may be appreciably increased, at the expense of the acid sludge. This may be effected by adding to the oil urea or one of its oil soluble or dispersible derivatives, such as urea sulphate. The oil containing the urea is then treated with oleum under sulphonating conditions, the acid sludge is removed, and the oil soluble mahogany sulphonic acids are recovered as such, or as soaps.

It is common practice to give an oil several acid treatments. Our invention covers acid treatment in the presence of urea in the first or any subsequent treatment, or in all treatments, and in each case, the amount of mahogany sulphonic acids formed is increased, and the amount of acid sludge is decreased. The urea goes into the acid sludge layer, and may be recovered therefrom as the sulphate.

The following example illustrates one method of carrying out our invention but it is understood that this example is by way of illustration and not of limitation.

13.3 grams of urea sulphate are dissolved in one thousand grams of a mineral oil fraction, and the oil is treated with 133 grams of oleum under sulphonating conditions, for example at a temperature up to about 140° F. The acid treated oil is allowed to settle, and the acid sludge containing the green sulphonic acids and urea sulphate is withdrawn. The mahogany sulphonic acids may be directly removed from the oil by extraction with dichloroethyl ether, or such acids may be neutralized, and then extracted with alcohol. In either case, the mahogany sulphonic bodies may be recovered by distillation.

The above method of obtaining the mahogany bodies permits economy in oleum, and the yield of such bodies is considerably higher, than when the acid treatment is carried out in the absence of urea or its derivatives. These advantages may be realized in the first acid treatment, in any subsequent acid treatment, including the last acid treatment in the preparation of a white oil, such as tree spray or transformer oil, or in all or in any parts of such treatments.

The data recited in the following table show the modifying action of urea on oleum:

MINERAL OIL FRACTION

*Oleum treated*

| Method | Percent yield of sludge | Percent yield of mahogany sulphonic acids |
|---|---|---|
| Without urea | 20.4 | 7.0 |
| With urea | 15.0 | 12.8 |

The data recited in the foregoing table demonstrate that the presence of urea modifies the action of the oleum to such an extent that the sludge obtained from the urea experiment is considerably less than in the check run while the increase in yield of mahogany sulphonic acids in the presence of urea is materially higher than in the run without urea. The foregoing description is by way of illustration and not of limitation and we are not to be limited to any details, but only by the appended claims.

We claim:

1. In the process of refining a mineral oil, the step comprising treating a mineral oil fraction with oleum in the presence of a member of the group consisting of urea and salts of urea under sulphonating conditions.

2. The process comprising treating a mineral oil fraction with oleum in the presence of a member of the group consisting of urea and salts of urea under sulphonating conditions, and recovering from the treated oil the mahogany sulphonic bodies formed during sulphonation.

3. The process comprising treating a mineral oil fraction with oleum in the presence of a member of the group consisting of urea and salts of urea under sulphonating conditions, removing the acid sludge formed, and recovering from the treated oil the mahogany sulphonic bodies formed during sulphonation.

4. The process comprising sulphonating a mineral oil fraction, removing the acid sludge, treating the sulphonated oil with oleum in the presence of a member of the group consisting of urea and salts of urea under sulphonating conditions, removing the acid sludge formed, and recovering from the treated oil the mahogany sulphonic bodies formed during sulphonation.

5. The process comprising treating a mineral oil fraction with oleum in the presence of a member of the group consisting of urea and salts of urea under sulphonating conditions, removing the acid sludge, again treating the sulphonated oil with oleum in the presence of a member of the group consisting of urea and salts of urea under sulphonating conditions, and recovering from the treated oil the sulphonic bodies formed during sulphonation.

FERDINAND W. BRETH.
MANUEL BLUMER.